O. E. BROWN.
NON-SLIPPING ATTACHMENT FOR HORSESHOES.
APPLICATION FILED FEB. 26, 1915.
1,160,834.
Patented Nov. 16, 1915.
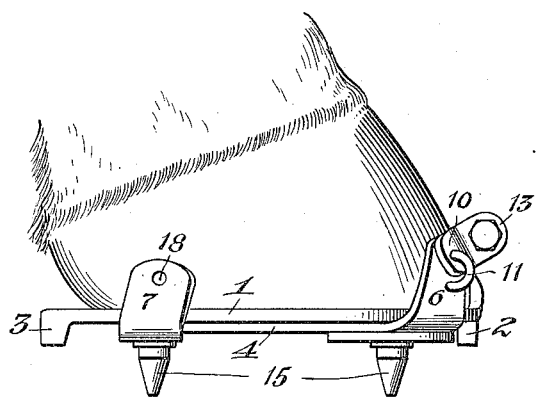
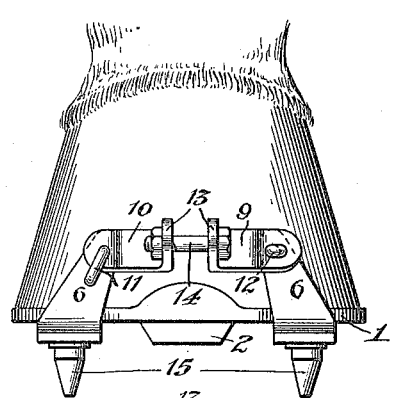
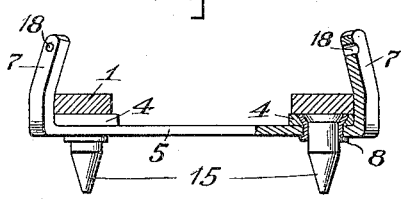
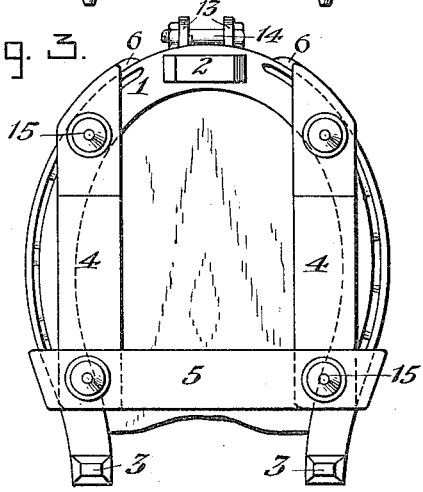
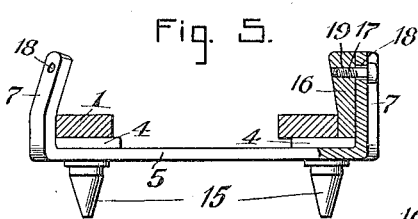
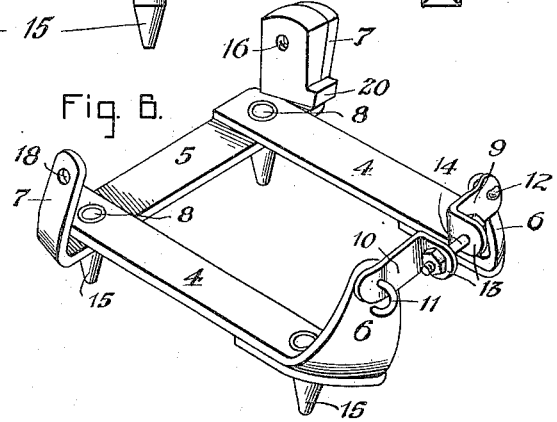
WITNESSES
Walter P. Geyer.
W. Ray Taylor
INVENTOR
Oscar E. Brown,
by Geyer Popp
ATTORNEYS.

UNITED STATES PATENT OFFICE.

OSCAR E. BROWN, OF BUFFALO, NEW YORK.

NON-SLIPPING ATTACHMENT FOR HORSESHOES.

1,160,834.  Specification of Letters Patent.  Patented Nov. 16, 1915.

Application filed February 26, 1915. Serial No. 10,734.

*To all whom it may concern:*

Be it known that I, OSCAR E. BROWN, a citizen of the United States, residing at Buffalo, in the county of Erie and State of New York, have invented new and useful Improvements in Non-Slipping Attachments for Horseshoes, of which the following is a specification.

This invention relates to the detachable calk frames or overshoes, which are adapted to be placed over ordinary horseshoes and which are provided with sharp calks to prevent slipping of the animal.

One of the objects of my invention is the provision of a strong, light and inexpensive attachment of this character which can be readily applied to and removed from the hoof or shoe of the animal.

A further object is the provision of means whereby the overshoe can be adjusted to shoes of different sizes.

In the accompanying drawings: Figure 1 is a side elevation of the attachment applied to a horse's hoof. Fig. 2 is a front view thereof. Fig. 3 is a bottom plan of the same. Fig. 4 is a fragmentary vertical section showing the manner of applying the calks to the frame. Fig. 5 is a similar view of a modified construction of the invention. Fig. 6 is a perspective view of the attachment removed from the hoof.

Similar characters of reference indicate corresponding parts throughout the several views.

1 indicates the ordinary horseshoe which is secured to the hoof of the animal in the usual way and which is provided with the customary toe calk 2 and heel calks 3.

The improved non-slipping attachment comprises a pair of horizontally movable longitudinal bars 4 pivoted at their rear ends to the opposite ends of a transverse heel bar 5. Each of these longitudinal bars 4 is provided at its front end with upwardly extending lugs or lips 6 which are adapted to overlap or bear against the front portion of the shoe or hoof, or both. The heel bar 5 is provided at its ends with similar upwardly-extending lugs or lips 7 adapted to overlap or bear against the rear portion of the shoe or hoof. Both pairs of lugs are preferably bent inwardly to conform to the inclination of the hoof and their inner faces conform to the contour of the shoe to snugly fit the same.

The longitudinal side bars 4 are pivotally connected to the heel bar 5 preferably by means of hollow rivets 8, which, as clearly shown in Fig. 4, are countersunk in the side bars 4 and upset on the underside of the heel plate 5, so as to hold them in place.

The front ends of the longitudinal bars 4 are connected together by any suitable clamping device, the preferred means shown in the drawings consisting of a pair of tie-straps or members 9, 10, which extend across the toe of the hoof. One of these straps engages a staple 11 rigidly secured to one of the front lips 7 while the other strap is removably engaged with a pin or hook 12 secured to the other of said front lips. At their inner ends the straps are provided with perforated ears 13 through which a clamping bolt 14 passes.

The hollow rivets 8 perform the additional function of openings or sockets for the reception of suitable calks 15. These calks are preferably constructed in the form of pins having conical heads and pointed or sharpened lower ends. They are confined in the rivets by these heads which are countersunk in the enlarged upper ends of the rivets and which bear against the underside of the horseshoe 1, securely holding them in place in the frame when the latter is clamped to the shoe. By this construction, worn-out calks can be readily removed and replaced by new ones. The front portions of the longitudinal bars carry similar calks.

In applying the calk-frame or overshoe to the horseshoe, the tie-strap 9 is detached from the pin 12 and the logitudnal bars 4 are swung outwardly sufficiently to allow their lugs 6 to be passed over by the horseshoe. After placing the frame in this condition against the underside of the shoe, the longitudinal bars are swung inwardly until their lugs 6 bear against the edges of the shoe, after which the frame is securely clamped in place by engaging the strap 9 with the pin 12 and tightening the bolt 14. As shown in Fig. 3, the lips of the transverse heel bar 5 are arranged to bear against the edge of the horseshoe in rear of its widest or bulging portions while the front lips 7 bear against the shoe in front of said portions, reliably holding the overshoe against forward and backward displacement.

This attachment can also be adjusted to hoofs or horseshoes of different sizes. As the front portions of the side or longitudinal bars 4 are capable of swinging laterally, the front portion of the calk-frame is obviously adjustable to different-sized hoofs. The effective width of the rear or heel portion of the frame is reduced to suit different sized hoofs by applying blocks or wedges 16 of different thicknesses to the inner side of one or both of the rear lugs 7, Figs. 5 and 6 showing such a block applied to one of said lugs and bearing against the outer edge of the horseshoe. In the preferred construction shown in said figures, the lug carrying said block is bent inwardly to a position substantially at right angles to the heel bar 5, and the bearing face of the block is inclined or beveled so as to recede toward its lower end and conform to the taper of the hoof. By this construction the block resists downward displacement of the calk-frame on the horseshoe when the frame is clamped thereto. The block is removably secured in place by any suitable means, the device shown in the drawings consisting of a screw or bolt 17 passing through an unthreaded opening 18 in the lug 7 and into a screw threaded hole 19 in the block. To hold the block from pivotal motion on said bolt, it is preferably provided at its base with an outwardly projecting lug or stop 20 which overlaps the front edge of the adjacent lip 7, as shown in Fig. 6.

This improved non-slipping attachment is strong, light and durable in construction, and as it comprises few parts, it is inexpensive. Its adjustability to different-sized hoofs or shoes does away with the necessity of manufacturing it in numerous sizes.

I claim as my invention:

1. A non-slipping attachment for horseshoes, comprising a transverse heel-member, laterally-movable longitudinal members having their rear ends connected to said heel member by vertical pivots, said members having means adapted to engage a hoof or horseshoe, and clamping means engaging the front portions of said longitudinal members.

2. A non-slipping attachment for horseshoes, comprising a transverse heel-member provided at its ends with upwardly-extending lugs, laterally-swinging longitudinal members having their rear ends connected to the end portions of said heel member by vertical pivots and provided at their front ends with upwardly-extending lugs, clamping means connecting the lugs of said longitudinal members, and calks carried by said members.

3. A non-slipping attachment for horseshoes, comprising a transverse heel-bar, laterally-movable longitudinal bars pivoted at their rear ends to said heel bar, clamping means connecting the front ends of said longitudinal bars, said heel-bar having upwardly extending lugs adapted to engage a hoof or horseshoe, and a block removably secured to the inner side of one of said heel-bar lugs by a transverse bolt, said block being provided below said bolt with a stop arranged to engage said lug.

4. A non-slipping attachment for horseshoes, comprising a transverse heel-bar, laterally-movable longitudinal bars pivoted at their rear ends to said heel bar, clamping means connecting the front ends of said longitudinal bars, said heel-bar having upwardly extending lugs adapted to engage a hoof or horseshoe, and a wedge-shaped block applied to the inner side of one of said lugs, the bearing face of said block receding toward its base.

5. A non-slipping attachment for horseshoes, comprising a plurality of jointed bars connected by hollow rivets forming combined pivots and calk-sockets, and calks removably seated in said sockets.

6. A non-slipping attachment for horseshoes, comprising a plurality of jointed bars connected by hollow, open-ended rivets forming combined pivots and calk sockets, and calks consisting of headed pins seated in said sockets.

7. A non-slipping attachment for horseshoes, comprising a transverse heel bar, a pair of longitudinal bars extending forwardly from the end portions of said heel bars, hollow rivets pivotally connecting the rear ends of said longitudinal bars to said heel bar, and calks removably seated in said rivets.

Witness my hand this 25th day of February, 1915.

OSCAR E. BROWN.

Witnesses:
C. F. GEYER,
E. M. GRAHAM.

Copies of this patent may be obtained for five cents each, by addressing the "Commissioner of Patents, Washington, D. C."